July 20, 1965

A. BOSCHI 3,195,712

MOVABLE CONVEYOR-TYPE STRIP FOR PEDESTRIANS

Filed May 28, 1962

INVENTOR.
Antonio Boschi
BY
Stevens, Davis, Miller & Mosher
ATTORNEYS

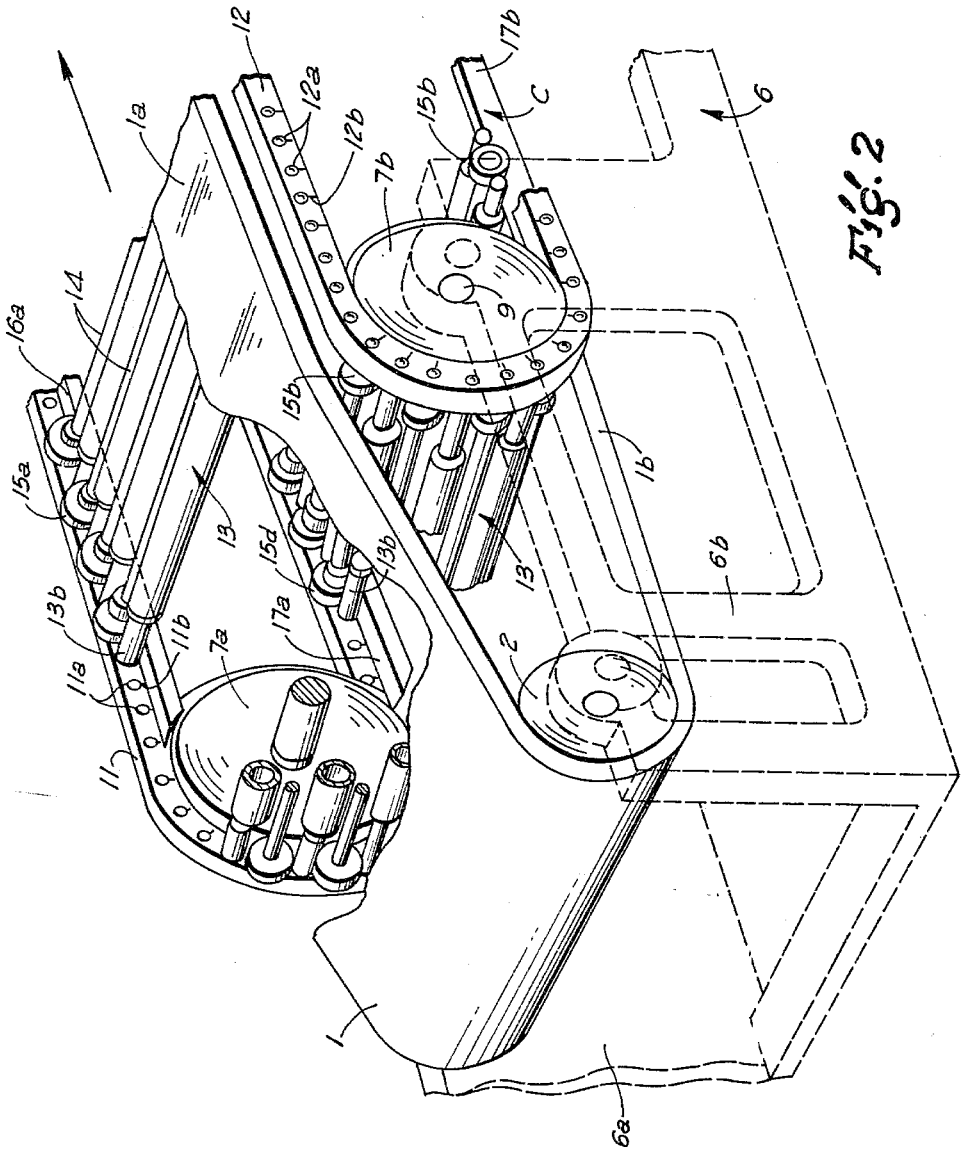

July 20, 1965

A. BOSCHI 3,195,712

MOVABLE CONVEYOR-TYPE STRIP FOR PEDESTRIANS

Filed May 28, 1962

INVENTOR.
Antonio Boschi
BY
Stevens, Davis, Miller & Mosher
ATTORNEYS

INVENTOR.
Antonio Boschi

INVENTOR.
Antonio Boschi

INVENTOR.
Antonio Boschi
BY
ATTORNEYS

United States Patent Office 3,195,712
Patented July 20, 1965

3,195,712
MOVABLE CONVEYOR-TYPE STRIP FOR PEDESTRIANS
Antonio Boschi, Milan, Italy, assignor to Pirelli S.p.A., Milan, Italy
Filed May 28, 1962, Ser. No. 197,976
Claims priority, application Italy, June 7, 1961, 10,487/61
5 Claims. (Cl. 198—184)

This invention relates to improvements in conveyor apparatus and more particularly, but not by way of limitation, to movable endless belt or strip type conveyors for pedestrians which comprise a continuous strip of flexible material stretched horizontally or at an angle between a pair of drums, or between a drum and a corresponding element, whose upper portion or course constitutes the true moving path or pavement used by the pedestrians. Also, it should be apparent that the conveyor apparatus may be used for transporting packaged goods, or the like, if desired.

The loads which may be carried by a conveyor apparatus, and particularly the belt type conveyor devices, are limited by the strength of the belt, and it is, therefore, necessary to provide a suitable support for the upper course or load carrying portion of the belt. Presently available conveyor belts are usually provided with either a creeping type support, or a support mounted on rotatable rollers to provide the required strength for the belt to carry the loads to be transported thereby.

In the conveyor devices having the creeping type support, the upper course of the conveyor creeps on an underlying rigid base, normally constructed of plate metal, or the like, and the base is usually continuously lubricated in order to reduce the friction between the base and the conveyor belt. This type of supporting mechanism, however, is suitable only for conveyors of a relative short length, normally not exceeding four or five meters. As a practical matter, in the case of conveyors of greater lengths, it is found that efficient lubrication thereof is extremely difficult, particularly when the conveyor is subjected to a full load as the consumption of the motive power required for dragging the conveyor is considerably increased, and the parts in creeping contact, namely the base and the conveyor belt itself, are subjected to a considerable amount of heat from the friction therebetween, and an inherent wearing of the parts. Since the conveyor belt is normally constructed of a material consisting mainly of rubber, the heating and wearing action in combination with the tension stress applied to the upper portion of the belt results in a rapid destruction thereof. Furthermore, even steel-lined conveyors will not permit the utilization of lengths over the above cited limits since the friction between the belt and the base, in the full load operating conditions, may be greater than the adherence of the conveyor belt to the dragging drum, with a resultant sliding of the belt on the drum and a danger of overheating.

In the supporting system assembled on rotatable rollers, the upper course of the conveyor moves on a plurality of rollers, each of which is supported at its ends by means of a pair of bearings, usually of the ball bearing type. However, in this case, the upper portion or course of the conveyor tends to form a catenary between each pair of supporting rollers, and, as a result, the pedestrian travelling on the conveyor is subjected to a continuous series of jerks. Attempts have been made to reduce the catenaries by limiting the flexibility of the conveyor belt. For example, the belt thickness and tension may be increased, or the reinforcing members of the belt and conveyor structure may be strengthened or stiffened. It has been noted, however, that these expedients have resulted in a greater construction cost for the conveyor and an increase in the motive power required for its operation, as well as necessitating the use of drums of relatively large diameter to avoid or reduce the problem of catenaries.

A more desirable result has been obtained by increasing the number of supporting rollers to provide as great a number thereof as possible for each meter of length of the upper portion of the conveyor, proportionally with the the resistance of the rollers to flection. In this instance, the catenary effect was satisfactorily overcome by providing at least thirty rollers for each meter of length, but this involved the use of at least sixty bearings for supporting the rollers for each meter of length of the conveyor. Thus, a conveyor ten meters in length required the use of at least six hundred bearings, which greatly increases the overall cost and maintenance requirements for the efficient operation of the conveyor.

The present invention contemplates a novel conveyor apparatus particularly designed and constructed for overcoming the above mentioned disadvantages. The novel conveyor provides a maximum number of rolling members supported in a manner whereby the need for end bearings is eliminated. Track means is provided for receiving a plurality of rolling members, and the rolling members are moved along the track means by the frictional drag of the conveyor belt supported thereby. Means is also provided for overcoming any lagging action of any of the rolling members moving along the track means, and the rolling members falling off the terminal end of the conveyor are collected and supported with a minimum of friction and are subsequently reinserted in the cycle on the track means at the opposite or starting end of the conveyor for efficiently supporting the conveyor belt.

In the specific embodiment of the invention depicted herein, the rolling members are elongated rollers supported at their opposed ends by a pair of spaced tracks. The ends of the rollers are preferably provided with a portion of reduced diameter with respect to the diameter of the central portion thereof, and the reduced diameter portion is connected to the central portion by a frusto-conical portion disposed adjacent to the corresponding track. The relationship between the diameter of the central portion of the roller and the ends thereof, as well as the frusto-conical portion interconnecting them provide important results. It is to be noted that each roller member rolls along the tracks during operation of the conveyor in such a manner that, when creeping is eliminated, the speed of translation of the roller in the forward direction of the conveyor is a direct function of the corresponding rolling radii and the advancing speed of the conveyor belt, the weight of which drags the rollers along the tracks. If the diameter of the roller were constant throughout its length, or equal to the rolling radii, the speed of translation of the roller along the tracks would correspond to one half of the advancing speed of the conveyor. However, by reducing the diameter of the ends resting or supported by the tracks, the speed of translation of the roller is reduced, with a resultant reducing in the wear of the tracks. Furthermore, a roller having reduced end portions is more easily dragged by friction from the upper portion of the conveyor belt, as well known in the law of levers, and creeping between the roller and the conveyor belt is eliminated, with a consequent reduction in wear of both the rollers and belt.

In addition, the frusto-conical portion interconnecting the central portion of the roller with the reduced end portions thereof provides for a self-setting of the rollers, which is very important, since, without this feature, each roller must be provided with a pair of end bearings in order to be driven and to maintain a direction of translation consistent with the advancing direction of the conveyor. However, in the present invention, if any of the rollers has a tendency to assume an inclined or angled position, that is a portion in which one of its ends is "late" or lags with respect to the other, the frusto-conical portion adjacent to the lagging end must climb the respective track, which immediately increases the corresponding rolling radius and therefore accelerates the speed of the lagging end until the roller is restored to the correct position therefor.

It is, therefore, apparent that in the preferred form of the invention all of the rollers roll along the two tracks with a minimum of effort from the dragging action exerted on the rollers by the upper portion of the conveyor belt, and without the use of end bearings or other driving means. Furthermore, it is evident that the wear on the rollers, tracks and conveyor belt is substantially negligible.

In order to reduce or substantially eliminate noise during operation of the conveyor apparatus, it is preferable that the tracks be covered with a suitable elastic material of sufficient toughness for withstanding the pressure of the roller ends moving therealong. For this purpose, a nitrile rubber having a hardness of approximately 90 Shore has been found to be particularly suitable.

The rollers may be collected at the terminal end of the conveyor and reinserted in the cycle at the starting end thereof by any suitable means. However, one of the features of the present invention, in addition to those hereinbefore set forth, is that of providing a reversible conveyor apparatus; that is, a conveyor in which the advancing direction can be determined or reversed at any desired time without being dependent upon the structure of the said means. Thus, the means for collecting the rollers and reinserting them in the cycle is particularly designed and constructed for operation in either direction, thereby facilitating a reversible operation of the conveyor apparatus, as will be hereinafter set forth. More generally the means for collecting and reinserting the rollers in the cycle comprises continuous chain means which loosely engages each of the rollers and moves simultaneously therewith.

A preferred form of the invention comprises two chain elements for receiving the opposed ends of each of the roller members therein, the said ends of each roller are provided with axially extending trunnions engaged in the corresponding link of the chain element with a substantial radial clearance. Each of the chain elements is stretched over a pair of coplanar pulleys journalled adjacent to the corresponding ends of the track members which support the reduced end portions of each roller. Thus, the two chain elements and the rollers extending therebetween constitute a continuous chain, circulating on two pairs of spaced pulleys, and in which the end trunnions of the individual rollers are suspended with a substantial radial clearance in order to eliminate unnecessary friction. Substantially the only friction present between the roller and the chain in the lower portion of the conveyor is that generated by the dragging and supporting engagement required when each individual roller leaves the tracks at the terminal end of the conveyor, and as each roller is brought back to be reinserted in the cycle at the starting end of the conveyor.

An alternative form of the invention may be provided by eliminating one of the end drums, more particularly the non-driving drum over which the conveyor belt is stretched. In this embodiment, the conveyor belt will be received over the roller members moving in the track portion corresponding to the excluding or eliminated drum.

A further modification of the invention may be provided by forming the end portions of the tracks downwardly in an arcuate configuration conforming substantially to that of the pulleys. In this embodiment, the pulleys may be eliminated, and the rollers move along the tracks both horizontally and along the curved portion, and upon leaving the curved portion thereof, the rollers move down to the lower tracks and continue rolling therealong in a reverse direction, having inverted their direction in the relatively short distance between the upper tracks and the lower tracks.

It is an important object of this invention to provide a novel conveyor apparatus of the type described herein which may be constructed of a relatively long length with a minimum of frictional heating and wear during the operation thereof.

It is another object of this invention to provide a novel conveyor apparatus having a continuous belt supported by a plurality of rollers and wherein the necessity of end bearing members is eliminated.

Another object of this invention is to provide a conveyor apparatus of the type described herein which is designed for utilization of a substantially large number of rollers per unit length in order to eliminate the catenary effect at a greatly reduced cost than heretofore possible.

A further object of this invention is to provide a conveyor apparatus of the continuous belt type wherein friction in the lower portion thereof is reduced to a minimum for reducing the motive power requirements for driving thereof and increasing the operating efficiency thereof.

A still further object of this invention is to provide a conveyor apparatus of the continuous belt type wherein the advancing direction thereof may be determined or reversed at any desired time.

Still another object of this invention is to provide a conveyor apparatus of the type described herein wherein operational noise is maintained at a minimum.

Other and further objects and advantageous features of the present invention will hereinafter more fully appear in connection with the detailed description of the drawings in which:

FIGURES 1a and 1b taken together comprise an elevational view of a conveyor apparatus embodying the invention. FIGURE 1a represents the non-driven end of the conveyor and FIGURE 1b illustrates the driven end thereof.

FIGURE 2 is a perspective view of a portion of a conveyor apparatus embodying the invention, with portions thereof eliminated for purposes of illustration.

Figure 1A:
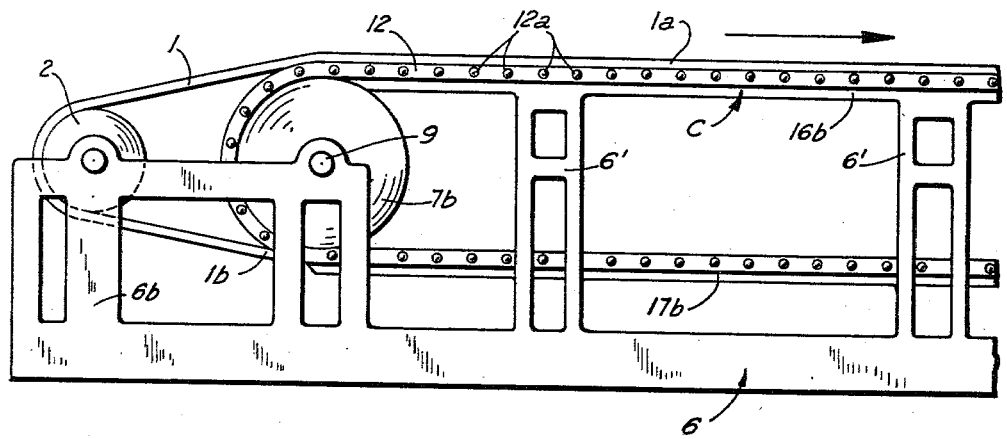
Figure 1B:
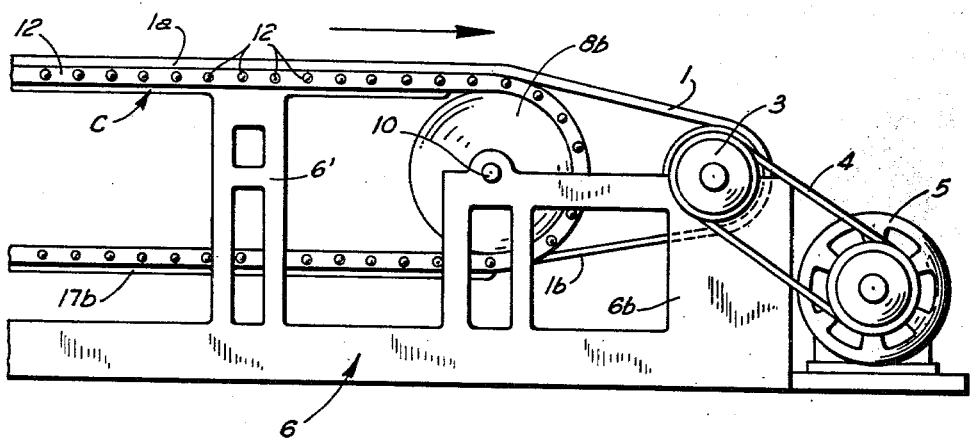
Figure 9A:
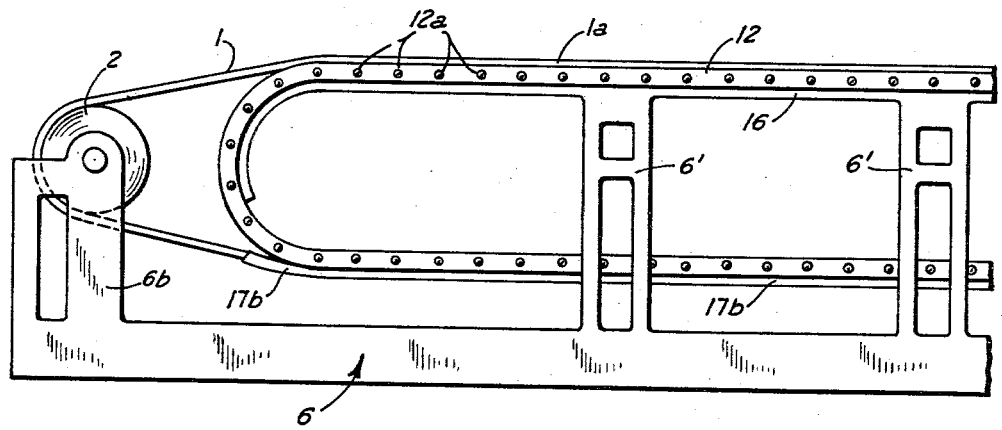
Figure 9B:
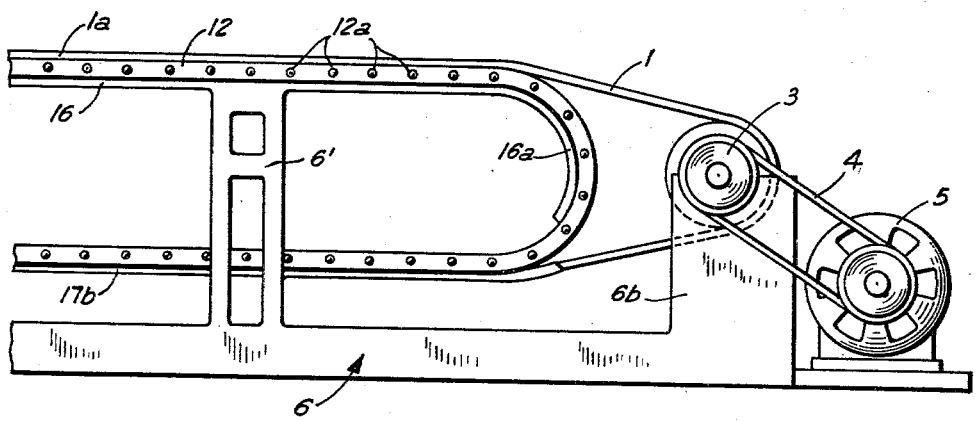

FIGURES 9a and 9b taken together comprise a view similar to FIGURES 1a and 1b depicting a modified form of the invention.

Figure 10:
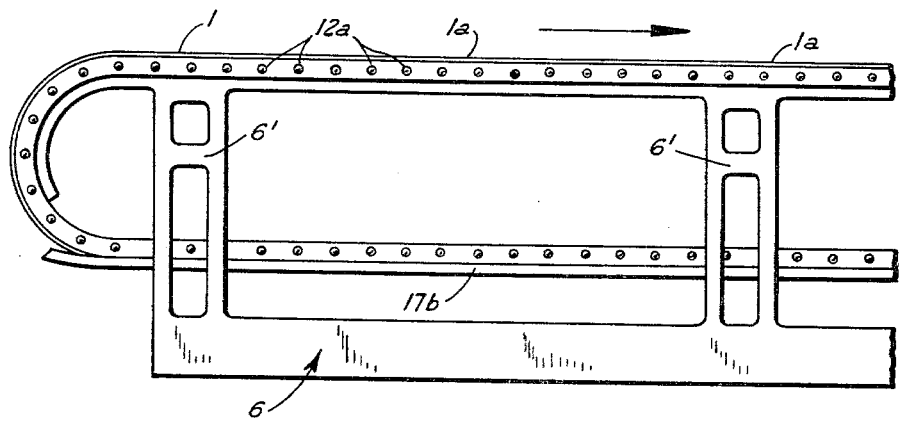

FIGURE 10 is a view similar to 1a depicting still another modification of the invention.

Referring to the drawings in detail, and particularly FIGURES 1 through 8, the movable conveyor C comprises a continuous belt or strip 1 constructed of a flexible material, stretched between a pair of cylinders or drums 2 and 3, rotatably supported between the sides 6a and 6b of a frame 6. The strip 1 is preferably made of rubber reinforced with textile layers, or the like, as is well known. The drum 3 is actuated by an electric motor 5 through a suitable transmission which is shown herein as a V-belt 4, whereby the continuous strip 1 may be dragged on the drums 2 and 3 in the desired direction. It will be apparent that rotation of the driving drum 3 in one direction will cause the strip 1 to move in a corresponding direction, whereas rotation of the driving drum 3 in an opposite direction will reverse the direction of travel of the strip 1.

A pair of spaced shafts 9 and 10 are suitably journalled between the side portions 6a and 6b and are inwardly disposed with respect to the corresponding drums 2 and 3. The shafts 9 and 10 extend transversely with respect to the strip 1 and are disposed between the upper portion 1a and the lower portion 1b thereof. A pair of pulleys 7a and 7b are suitably keyed to the shaft 9 and are preferably spaced thereon for disposition adjacent the corresponding sides 6a and 6b, respectively, as clearly shown in FIGURE 2. Similarly, a pair of pulleys 8a (not shown) and 8b are keyed to the shaft 10 adjacent the respective sides 6a and 6b whereby the pulleys 8a and 8b are coplanar with the pulleys 7a and 7b, respectively. A chain element 11 is stretched around the pulleys 7a and 8a, and a corresponding chain element 12 is similarly stretched around the pulleys 7b and 8b. The chain elements 11 and 12 are substantially identical and are constructed from a continuous rubber ring of a substantially rectangular cross sectional configuration, and are reinforced with wires, or the like (not shown), whereby the chain elements are substantially inextensible. In addition, the chain elements 11 and 12 are each provided with a plurality of equally spaced holes 11a and 12a, respectively, which extend transversely therethrough. The apertures 11a and 12a are axially parallel to the shafts 9 and 10, and are in alignment for a purpose as will be hereinafter set forth. Each alternate pair of aligned apertures 11a and 12a receives the opposed ends of a roller member 13 which supports the strip 1.

Figure 5:
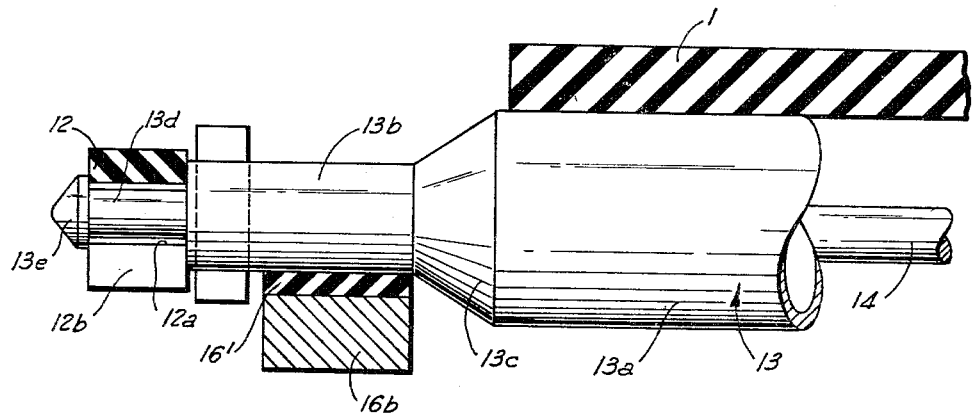
FIGURE 5 is a sectional view taken along line 5—5 of FIGURE 3.

Each of the rollers 13 comprises a steel tubular body portion 13a having opposed ends 13b of a reduced diameter. The end portions 13b are connected with the body portion 13a by a frusto-conical portion 13c. Referring particularly to FIGURE 5, an axial trunnion 13d, terminating with a head member 13e, extends from each end 13b. Each trunnion 13d of the roller 13 is disposed in the corresponding aligned apertures 11a and 12a, and it will be noted from the drawings that there is a considerable clearance between the trunnions and the respective aperture. A radial slit or cut 11b extends from each aperture 11a to the inner periphery of the chain element 11, and a similar radial slit 12b extends from each aperture 12a to the inner periphery of the chain element 12 whereby the trunnions 13d may be inserted into the corresponding apertures 11a and 12a. It will be apparent that the trunnions 13d are preferably of a smaller diameter than the end portions 13b, and the end portions 13b and head members 13e cooperate for retaining the trunnions 13d within the respective apertures 11a and 12a.

Figure 3:
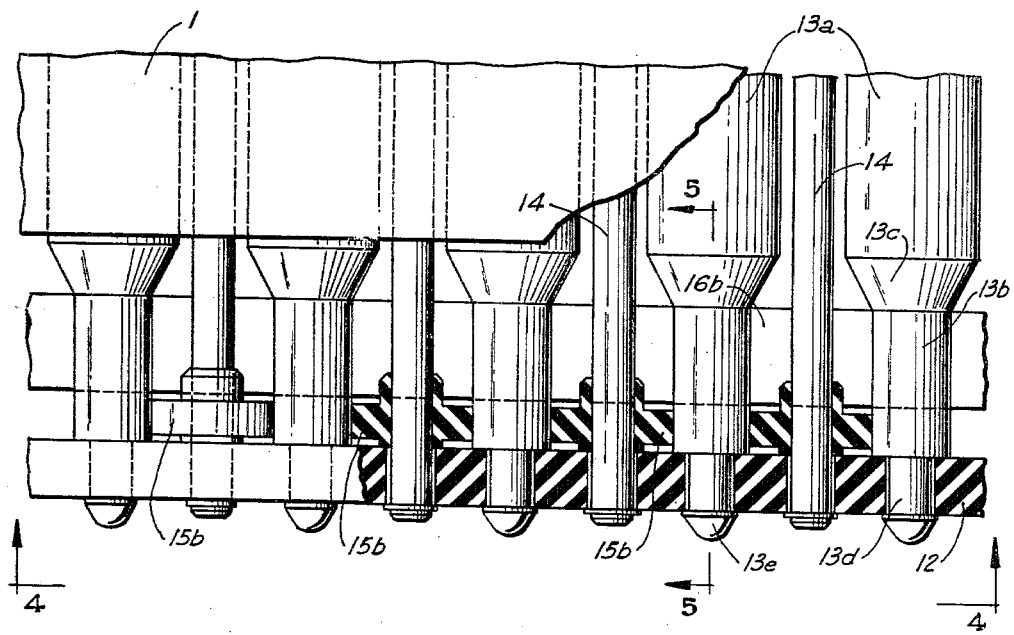
FIGURE 3 is a plan view, partly in section, of a detail of the conveyor apparatus.
Figure 4:
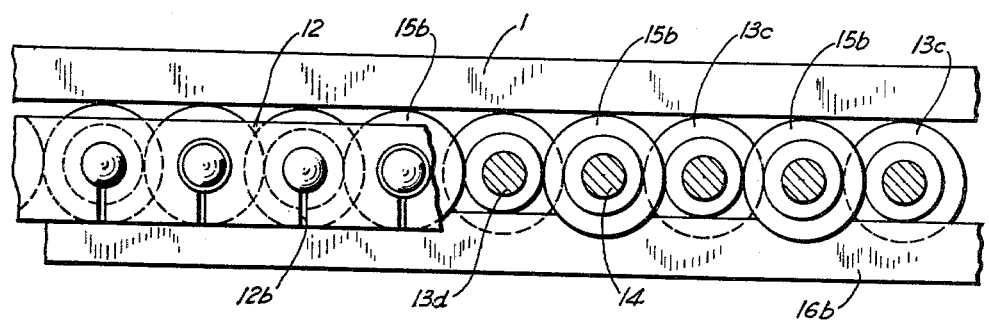
FIGURE 4 is a sectional view taken along line 4—4 of FIGURE 3.
Figure 6:
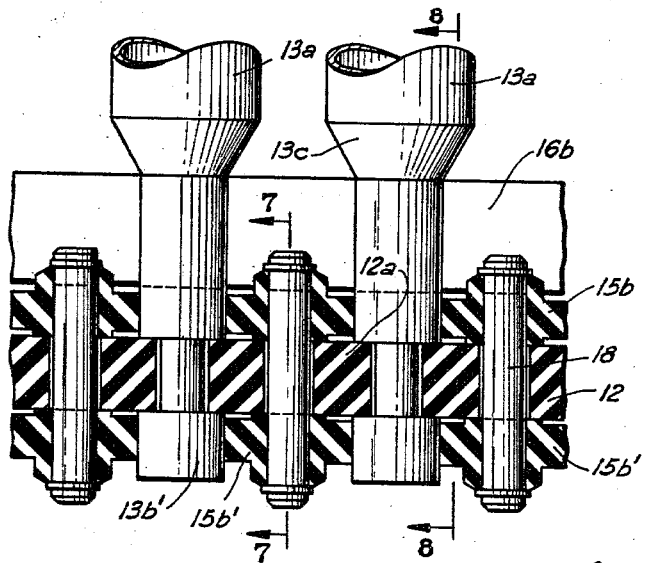
FIGURE 6 is a view similar to FIGURE 3 depicting a modified form of the invention.
Figure 7:
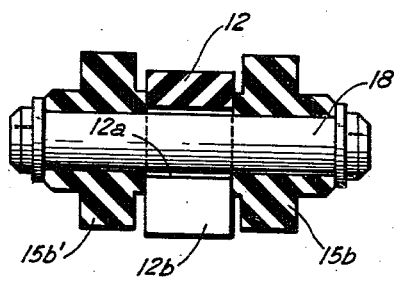
FIGURE 7 is a sectional view taken along line 7—7 of FIGURE 6.
Figure 8:
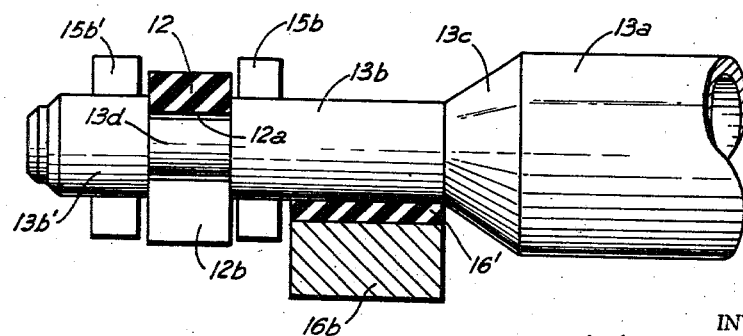
FIGURE 8 is a sectional view taken along line 8—8 of FIGURE 6.

Referring more particularly to FIGURES 6 through 8, the embodiment of the invention depicted therein provides a head 13b' in lieu of the head member 13e depicted in FIGURES 3 and 5. The head member 13b' is a cylindrical body having substantially the same diameter as the end portion 13b of the respective roller 13 for a purpose as will be hereinafter set forth.

At any rate, the axial length of the body 13a of each roller 13 is substantially equal to the width of the strip 1. The ends 13b of each roller, being of a reduced diameter as hereinbefore set forth, are supported by and roll on a pair of spaced tracks 16a and 16b, which are disposed parallel to the longitudinal edges of the upper portion 1a of the belt or strip 1. The tracks 16a and 16b are rigidly supported by the vertical rods or support members 6' of the frame 6 and are disposed in tangential relationship with respect to the pulleys 7a, 8a, and 7b, 8b, respectively. Thus, the track 16a extends longitudinally between the coplanar pulleys 7a and 8a, and the track 16b similarly extends between the coplanar pulleys 7b and 8b for a purpose as will be hereinafter set forth. The tracks 16a and 16b are provided with a covering or layer 16' of nitrile rubber which constitutes the surface upon which the corresponding ends 13b of the rollers 13 roll during operation of the conveyor apparatus C.

As clearly shown in FIGURES 3, 5, 6 and 8, the tracks 16a and 16b are spaced in such a manner as to be disposed in the proximity of the opposed frusto-conical portions 13c of the rollers 13 in order to initiate the self-setting effect as hereinbefore set forth. Thus, if either end portion 13b of any roller 13 tends to lag behind the opposite end portion thereof for any reason, the corresponding frusto-conical portion 13c will ride up on the respective tracks substantially immediately, whereby the speed of movement of the lagging end portion will be increased, and the roller 13 will be adjusted or automatically moved to the proper position in the cycle.

As hereinbefore set forth, the rollers 13 are supported in alternate pairs of aligned apertures 11a and 12a. In accordance with the particular embodiment of the invention depicted in FIGURES 1 through 5, each of the remaining pairs of aligned apertures 11a and 12a rotatably supports a transverse shaft 14. As clearly shown in the drawings, the shafts 14 are of a relatively small diameter and are loosely disposed in the respective apertures 11a and 12a. A pair of small wheels 15a and 15b made of rubber, or the like, are suitably keyed to each shaft 14 and are spaced thereon in such a manner as to be disposed outwardly with respect to the tracks 16a and 16b. The ends 13b of the rollers 13 also extend axially beyond the corresponding tracks 16a and 16b, and the diameter of the wheels 15a and 15b is such that, when the rollers 13 are substantially perfectly spaced and mutually parallel, the wheels 15a and 15b are slightly out of contact with the respective end portions 13b. Thus, the shafts 14 supporting the wheels 15a and 15b will not rotate during the normal or preferred operating conditions of the conveyor apparatus C.

Of course, during the operation of the conveyor C, it is likely that a temporary lack of contact, or an imperfect contact may take place between the upper portion 1a of the strip 1 and one of the rollers 13. In this event, the said roller may tend to lag behind the remaining rollers, and as a result, the small wheels 15a and 15b associated with the lagging roller will be engaged thereby, and brought into contact with the next succeeding roller 13 in the cycle by virtue of the clearance between the shaft 14 and ends 13b with the respective apertures 11a and 12a. The wheels 15a and 15b thus engaged between the pair of successive rollers 13 will impart rotation from the properly moving roller to the lagging roller in much the same manner as an idler gear, or the like. Thus, the clearance between the apertures and the respective shaft 14 and end portions 13b permits the occasional contact between the wheels 15a and 15b and the end portions 13b for maintaining a constant forward translational movement of the rollers 13 throughout the operation of the conveyor C.

The embodiment of the invention illustrated in FIGURES 6 through 8 differs from that shown in FIGURES 1 through 5 in that a pair of axially aligned trunnions 18 are utilized in lieu of each shaft 14. The aligned trunnions 18 are loosely disposed in a corresponding pair of aligned apertures 11a and 12a, and each trunnion 18 is provided with a pair of small wheels 15b and 15b' which are suitably secured to the opposed ends thereof. The wheel 15b cooperates with the ends 13b in the same manner as hereinbefore set forth, and the wheel 15b' similarly cooperates with the head member 13b', since the head members 13b' are of substantially the same diameter as the end portions 13b, as hereinbefore set forth.

During operation of the conveyor apparatus C, the motor 5 rotates the driving drum 3 through the V-belt 4, as is well known, whereby the endless belt or strip 1 is continually moved around the drums 2 and 3 in a corresponding direction. The upper portion 1a of the belt 1, being supported on the rollers 13, drags the rollers 13 through frictional contact therebetween, and the rollers 13 roll along the tracks 16a and 16b in the same direction as the advancing direction of the belt 1, for example, toward the right as viewed in FIGURE 1, and toward the pulleys 8a and 8b. As the rollers 13 leave the tracks 16a and 16b at the right end or terminal end of the conveyor C, the rollers remain suspended between the chain elements 11 and 12 without rotating about their own axes. The rollers are thus carried by the chain elements to the left end or starting end of the conveyor C and are disposed on the tracks 16a and 16b, which are adjacent to and tangentially disposed with respect to the pulleys, as hereinbefore set forth.

In order to eliminate excessive tension in the chain elements 11 and 12 from the weight of the rollers 13 disposed on the lower portions of the chains, it is preferable to provide a second pair of spaced track members 17a and 17b, which are similar to the tracks 16a and 16b. The tracks 17a and 17b are supported by the vertical rods or support members 6' of the frame 6, and are disposed adjacent to and tangential from the bottom of the corresponding coplanar pair of pulleys 7a, 8a and 7b, 8b, and are thus in substantial alignment with the tracks 16a and 16b.

FIGURES 9a and 9b illustrate a modification of the apparatus from that disclosed in FIGURES 1a and 1b. In this modification, the pulleys 7a, 7b, 8a and 8b have been eliminated, and the upper tracks 16a and 16b have been lengthened by curving the opposite ends thereof downwardly to conform substantially to the configuration of the pulleys. The tracks 17a and 17b may also be curved slightly upwardly at the opposite ends, as clearly shown in the drawings, for facilitating operation of the conveyor C. The conveyor apparatus functions in substantially the same manner as hereinbefore set forth, except that the chain elements 11 and 12 are stretched around the curved end portions of the upper tracks 16a and 16b instead of the pulleys.

FIGURE 10 illustrates still another modification of the invention in which the non-drive drum 2 has been eliminated in addition to the pulleys 7a, 7b, 8a and 8b. In this modification, the belt 1 winds up or moves over the rollers moving around the curved portions of the tracks 16a and 16b which correspond to the eliminated drum.

It will be readily apparent that the direction of travel of the belt 1 is in no manner effected by the structure of the conveyor apparatus C. The operation of the device is substantially the same regardless of the direction of travel of the belt, and the only thing necessary for changing the direction thereof is a reversal of the rotational direction of the driving drum 3.

By way of summary, the endless belt 1 is moved continuously during operation of the conveyor apparatus whereby the rollers are pulled along the tracks by frictional contact with the belt. As the rollers reach the terminal end of the apparatus, and fall from the upper tracks, they are maintained suspended between the chain elements and brought back along the lower tracks until they are once again disposed on the upper tracks for beginning the cycle once again. In the event any roller accidentally becomes disengaged from the frictional contact of the upper portion of the belt 1 and tends to lag behind the remaining rollers, the idler wheels interposed therebetween will transmit rotation from the next succeeding roller in the sequence for returning the lagging roller to the proper position in the cycle. Furthermore, in the event one of the rollers becomes angularly disposed in the cycle for any reason, the frusto-conical portion of the lagging end thereof will quickly restore the roller to the proper parallel position with respect to the remaining rollers. This restoration is accomplished by the frusto-conical portion adjacent the lagging end which climbs the respective track and immediately increases the corresponding rolling radius of that side of the roller. Therefore, the lagging side accelerates until the lagging end of the roller is restored to the correct position.

From the foregoing, it will be apparent that the present invention provides a novel conveyor apparatus of the continuous belt type wherein a maximum number of rollers per unit of length are utilized at a minimum of construction cost. The necessity of end bearings for the rollers is eliminated, and the friction in the lower portion of the conveyor apparatus is reduced to a minimum for increasing the useful life of the parts thereof and reducing the motive power required for operation of the conveyor. The novel device is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. A conveyor apparatus comprising a movable endless belt forming a load-conveying run, motor means for driving said belt, a plurality of rollers having end sections and extending transversely to and beneath said run for supporting said run across its width, a pair of transversely spaced tracks for supporting said end sections of said rollers, a pair of transversely spaced endless chain elements for receiving said rollers with a radial play, each of said rollers comprising a run supporting section having a diameter greater than the diameter of said end sections, and means located between said run supporting section and each of said end sections for maintaining said rollers in substantially parallel disposition on said tracks during operation of the conveyor apparatus.

2. A conveyor apparatus comprising a movable endless belt forming a load-conveying run, motor means for driving said belt, a plurality of rollers extending transversely to and beneath said run for supporting said belt across its width, a pair of transversely spaced tracks for supporting opposite end sections of said rollers in a run supporting condition, said belt adapted to impart rotational forces to said rollers so that said rollers move along said tracks due to the frictional engagement therewith, a pair of transversely spaced endless chain elements mounting said rollers so that a predetermined degree of radial play can take place between said rollers and said elements, said rollers engaging said tracks at one end thereof and disengaging said tracks at the other end thereof, each of said rollers comprising a run supporting section between said end sections, said run supporting section having a diameter greater than the diameter of said end sections and a frusto-conical portion located between said run supporting section and each of said end sections for maintaining said rollers in substantially parallel mutual disposition on said tracks during operation of the apparatus, and said chain elements each comprising a ring of elastomeric material formed with a plurality of equally spaced apertures in which said ends of said rollers are engaged with the radial play, and a radial slit which extends from each said aperture to the inner edge of said ring to provide for insertion of the respective end of said rollers to said apertures.

3. A conveyor apparatus comprising a movable endless belt forming a load-conveying run, motor means for driving said belt, a plurality of rollers extending transversely to and beneath said run for supporting said belt across its width, a pair of transversely spaced tracks for supporting opposite end sections of said rollers in a run supporting condition, said belt adapted to supply moving forces to said rollers whereby said rollers move along said tracks through frictional engagement therewith, a pair of transversely spaced endless chain elements connected to the ends of said rollers, said elements adapted to enable a degree of relative radial movement to take place between said rollers and said elements, said rollers engaging said pair of tracks at one end thereof and disengaging said tracks at the other end thereof, each said roller comprising a run supporting section located between said end sections, said run supporting section having a diameter greater than the diameter of said end sections, each said roller further comprising a frusto-conical portion located between said run, supporting section and each of said end sections for maintaining said rollers in substantially parallel mutual relationship while said rollers are engaged with said tracks, and idle wheel means mounted on each of said chain elements and adapted to freely rotate thereon, said idle wheel means adapted to be rotated by said end sections of said rollers.

4. A conveyor apparatus as set forth in claim 3, wherein each said idle wheel means comprises a shaft extending laterally between said pair of endless chain elements and a first wheel mounted on said shaft contacting one of said pair of endless chain elements and a second wheel mounted on said shaft contacting the other of said endless chain elements.

5. A conveyor apparatus as set forth in claim 3, wherein each said idle wheel means comprises a shaft extending through each chain element and a first wheel mounted on said shaft and on the inside of said chain element and a second wheel mounted on said shaft and on the outside of said chain element.

References Cited by the Examiner
UNITED STATES PATENTS

| | | | |
|---|---|---|---|
| 508,589 | 11/93 | Wishard | 198—184 |
| 733,804 | 7/03 | Blaisdell | 198—203 X |
| 1,313,111 | 8/19 | Page | 198—203 |
| 2,868,356 | 1/59 | Haaff | 198—203 |

SAMUEL F. COLEMAN, *Primary Examiner.*
EDWARD A. SROKA, *Examiner.*